United States Patent
Gacanin

(10) Patent No.: US 9,749,118 B2
(45) Date of Patent: Aug. 29, 2017

(54) METHOD AND APPARATUS FOR PROVIDING BIDIRECTIONAL COMMUNICATION BETWEEN SEGMENTS OF A HOME NETWORK

(75) Inventor: Haris Gacanin, Antwerpen (BE)

(73) Assignee: Alcatel Lucent, Boulogne-Billancourt (FR)

( * ) Notice: Subject to any disclaimer, the term of this patent is extended or adjusted under 35 U.S.C. 154(b) by 460 days.

(21) Appl. No.: 14/112,150

(22) PCT Filed: May 7, 2012

(86) PCT No.: PCT/EP2012/058346
§ 371 (c)(1),
(2), (4) Date: Oct. 16, 2013

(87) PCT Pub. No.: WO2012/156222
PCT Pub. Date: Nov. 22, 2012

(65) Prior Publication Data
US 2014/0064157 A1    Mar. 6, 2014

(30) Foreign Application Priority Data
May 16, 2011  (EP) .................................. 11305586

(51) Int. Cl.
*H04L 5/14*   (2006.01)
*H04L 12/28*  (2006.01)
*H04L 12/46*  (2006.01)

(52) U.S. Cl.
CPC ............ *H04L 5/14* (2013.01); *H04L 12/2832* (2013.01); *H04L 12/2838* (2013.01);
(Continued)

(58) Field of Classification Search
None
See application file for complete search history.

(56) References Cited

U.S. PATENT DOCUMENTS 5,917,820 A *  6/1999  Rekhter ................. H04L 45/00
                                                      370/392
6,392,997 B1 *  5/2002  Chen ...................... H04L 45/02
                                                      370/252
(Continued)

FOREIGN PATENT DOCUMENTS

EP    2343856 A1    7/2011
JP    6-098318      4/1994
(Continued)

OTHER PUBLICATIONS

International Searching Authority, Written Opinion of the International Searching Authority for application PCT/EP2012/058346, Nov. 16, 2013, pp. 1-4.*
(Continued)

*Primary Examiner* — Jenee Williams
(74) *Attorney, Agent, or Firm* — Harness, Dickey & Pierce, P.L.C.

(57) ABSTRACT

A method for providing bidirectional communication between segments of a home network includes receiving a first communication signal at a first interface of an inter-domain bridge during a first time interval; receiving a second communication signal at a second interface of the inter-domain bridge during the first time interval; generating a superimposed signal of the first communication signal and the second communication signal; and transmitting the superimposed signal through the first interface and the second interface during a second time interval. The second time interval occurs after the first time interval.

14 Claims, 3 Drawing Sheets

(52) U.S. Cl.
CPC ........ *H04L 12/462* (2013.01); *H04L 12/4616* (2013.01); *H04B 2203/5445* (2013.01); *H04L 2012/2843* (2013.01); *H04L 2012/2845* (2013.01)

(56) References Cited

U.S. PATENT DOCUMENTS

| | | | | |
|---|---|---|---|---|
| 2001/0014091 | A1* | 8/2001 | Yamada | H04L 1/0003 370/349 |
| 2002/0003774 | A1* | 1/2002 | Wang | H04B 7/0669 370/208 |
| 2002/0105947 | A1* | 8/2002 | Kitagawa | H04L 1/0041 370/366 |
| 2002/0181439 | A1* | 12/2002 | Orihashi | H04J 3/0605 370/350 |
| 2003/0012126 | A1* | 1/2003 | Sudo | H04L 1/1692 370/203 |
| 2003/0108028 | A1* | 6/2003 | Brunner | H04B 7/0854 370/347 |
| 2003/0223379 | A1* | 12/2003 | Yang | H04L 12/4641 370/256 |
| 2004/0170157 | A1* | 9/2004 | Kim | H04B 1/71635 370/349 |
| 2004/0233838 | A1* | 11/2004 | Sudo | H04L 1/06 370/208 |
| 2005/0025142 | A1* | 2/2005 | Barker | H04Q 11/04 370/389 |
| 2005/0030965 | A1* | 2/2005 | Aoki | H04L 12/18 370/432 |
| 2005/0071469 | A1* | 3/2005 | McCollom | H04L 67/1002 709/225 |
| 2005/0076114 | A1* | 4/2005 | Cook | H04L 29/06 709/224 |
| 2005/0083936 | A1* | 4/2005 | Ma | H04L 45/04 370/392 |
| 2005/0094676 | A1* | 5/2005 | Iwami | H04N 7/22 370/527 |
| 2005/0135390 | A1* | 6/2005 | Anderson | H04L 12/6418 370/401 |
| 2005/0226187 | A1* | 10/2005 | Minato | H04J 13/00 370/335 |
| 2006/0280112 | A1* | 12/2006 | Fujii | H02J 1/10 370/204 |
| 2007/0041407 | A1* | 2/2007 | Suzuki | H04N 21/235 370/522 |
| 2008/0130640 | A1 | 6/2008 | Hurwitz et al. | |
| 2008/0225687 | A1* | 9/2008 | Oksman | H04L 41/0893 370/201 |
| 2009/0116376 | A1* | 5/2009 | Fang | H04B 3/32 370/210 |
| 2010/0142975 | A1* | 6/2010 | Ivry | H04L 25/4906 398/182 |
| 2010/0182922 | A1* | 7/2010 | Iwami | H04B 7/0617 370/252 |
| 2011/0193932 | A1* | 8/2011 | Long | H04L 12/1827 348/14.07 |
| 2012/0226901 | A1* | 9/2012 | Pandey | H04L 12/283 713/150 |

FOREIGN PATENT DOCUMENTS

| | | |
|---|---|---|
| JP | 03-058658 B2 | 7/2000 |
| JP | 2003-345332 A | 12/2003 |
| JP | 4-84553 B2 | 4/2008 |
| WO | WO 01/05102 * | 1/2001 |

OTHER PUBLICATIONS

Japanese Patent Office Action dated Jan. 13, 2015, for Japanese Patent Application No. 2014-510727 (with English Translation).
Oksman, Vladimir et al. "G.hn: The New ITU-T Home Networking Standard". IEEE Communications Magazine, IEEE Service Center, Piscataway, US, vol. 47, No. 10, Oct. 11, 2002, pp. 138-145.
International Search Report for PCT/EP2012/058346 dated May 24, 2012.

* cited by examiner

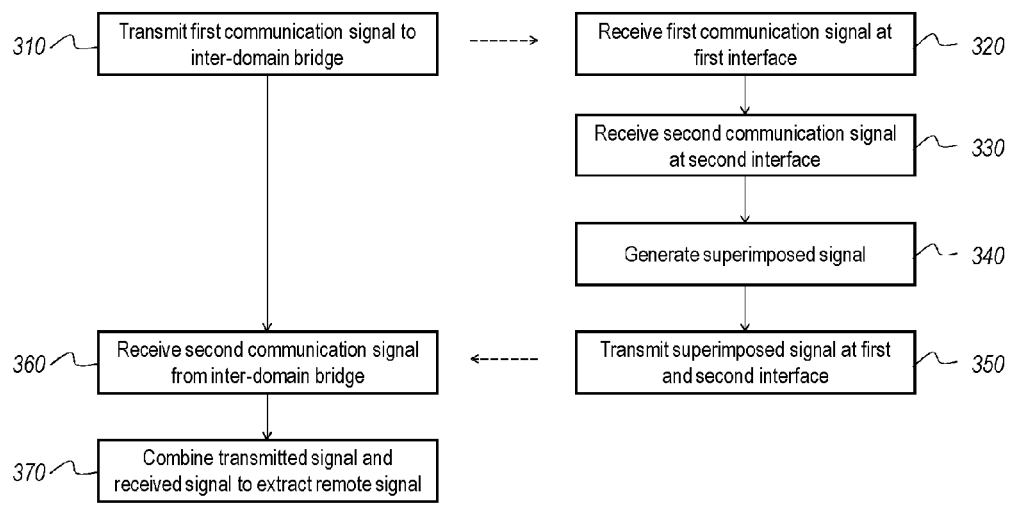
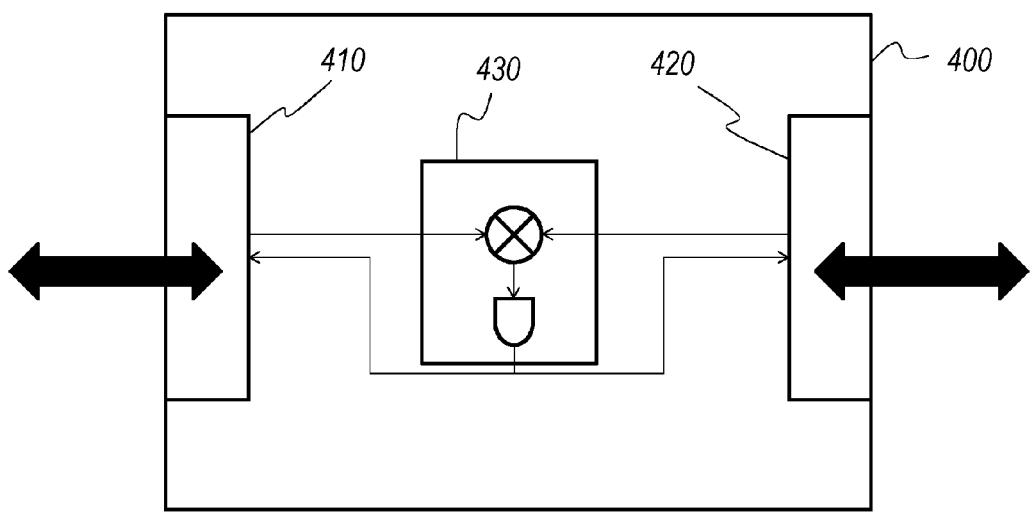

US 9,749,118 B2

METHOD AND APPARATUS FOR PROVIDING BIDIRECTIONAL COMMUNICATION BETWEEN SEGMENTS OF A HOME NETWORK

This application is the national phase under 35 U.S.C. §371 of PCT International Application No. PCT/EP2012/058346 which has an International filing date of May 7, 2012, which claims priority to European patent application number EP11305586.7 filed May 16, 2011; the entire contents of each of which are hereby incorporated by reference.

FIELD OF THE INVENTION

The present invention pertains to the field of home networks, more in particular to the field of data transmission over diverse physical home network segments.

BACKGROUND

In home networks, in particular home networks according to the G.hn family of Recommendations developed by the ITU-T (see ITU-T Rec. G.9961), communication between domains is conducted via domain managers. This architecture has limited scalability and does not allow for true bidirectional interaction across domains.

SUMMARY

It is an object of the present invention to improve scalability and bidirectional interaction across domains in home networks.

According to an aspect of the present invention, there is provided a method for providing bidirectional communication between segments of a home network, the method comprising: receiving a first communication signal at a first interface of an inter-domain bridge during a first time interval; receiving a second communication signal at a second interface of the inter-domain bridge during the first time interval; generating a superimposed signal of the first communication signal and the second communication signal; transmitting the superimposed signal through the first interface and the second interface during a second time interval, the second time interval occurring after the first time interval.

It is an advantage of the invention that network resources can be used more efficiently, by carrying out data relaying at the inter-domain bridges bidirectionally. The present invention is based inter alia on the insight that simultaneous transmission of different signals does not necessarily obscure the content of the message, because a transmitter can use its own copy of the transmitted message as a filter to extract the peer's message from the combined transmission.

The invention thus provides a form of network coding for use in a home network, which is preferably conducted at the physical, data link and/or network layer.

In an embodiment of the method of the present invention, the generating of the superimposed signal comprises combining binary data contents of the first communication signal with binary data contents of the second communication signal by applying an XOR-operation.

It is an advantage of this embodiment that the superposition happens in a mathematically straightforward and easy-to-implement manner. In this embodiment, the superposition can advantageously be applied at the media access control (MAC), layer, in which case the contents of the respective MAC frames are taken as the binary data contents of the first and second communication signal. Accordingly, the superimposed MAC frames are handed down to the physical layer and transmitted onto the media.

In an embodiment of the method of the present invention, the generating of the superimposed signal comprises adding a first physical parameter representing the first communication signal to a second physical parameter representing the second communication signal in the time domain.

It is an advantage of this embodiment that the superposition happens in a manner that requires minimal modifications to the existing physical layer equipment. In this embodiment, the superposition can advantageously be applied at the physical layer, in which case the physical representations of the respective communication signals, preferably of the respective MAC frames, are combined before transmission onto the media.

According to another aspect of the present invention, there is provided a method for communicating with a terminal in a different segment of a home network, the method comprising: transmitting a first communication signal to an inter-domain bridge during a first time interval; receiving a second communication signal from the inter-domain bridge during a second time interval; combining the transmitted first communication signal and the received second communication signal to extract a third communication signal, corresponding to a transmission from the remote terminal received at the inter-domain bridge.

This aspect of the invention translates the above described method to the end points of the bidirectional communication.

In an embodiment of the method of the present invention, the combining of the first communication and the second communication signal comprises combining binary data contents of the first communication signal with binary data contents of the second communication signal by applying an XOR-operation.

In an embodiment of the method of the present invention, the combining of the first communication and the second communication signal comprises subtracting a first physical parameter representing the first communication signal from a second physical parameter representing the second communication signal in the time domain.

According to another aspect of the present invention, there is provided a computer program configured to cause a processor to carry out the method according to any of the preceding claims.

According to another aspect of the present invention, there is provided an inter-domain bridge comprising: a first interface adapted to exchange signals with a first home networking segment, a second interface adapted to exchange signals with a second home networking segment, a superposition agent, operatively coupled to the first interface and the second interface, the superposition agent being configured to generate a superimposed signal of a first communication signal received from the first interface and a second communication signal received from the second interface, and to substantially simultaneously transmit the superimposed signal through the first interface and the second interface.

In an embodiment of the inter-domain bridge of the present invention, the superimposed signal comprises a combination of binary data contents of the first communication signal with binary data contents of the second communication signal obtained by applying an XOR-operation.

In an embodiment of the inter-domain bridge of the present invention, the superimposed signal comprises an addition of a first physical parameter representing the first communication signal to a second physical parameter representing the second communication signal in the time domain.

According to another aspect of the present invention, there is provided a communication terminal comprising: a communication interface for exchanging signals with an inter-domain bridge via a home network domain; a transmitter for transmitting an outgoing communication signal through the communication interface; a receiver for receiving an incoming communication signal through the communication interface; and means for removing a component corresponding to the outgoing communication signal from the incoming communication signal in order to arrive at a difference signal.

In an embodiment of the communication terminal of the present invention, the difference signal is a combination of binary data contents of the incoming communication signal with binary data contents of the outgoing communication signal obtained by applying an XOR-operation.

In an embodiment of the communication terminal of the present invention, the difference signal is a difference of a first physical parameter representing the incoming communication signal to a second physical parameter representing the outgoing communication signal in the time domain.

According to another aspect of the present invention, there is provided a system comprising an inter-domain bridge and two communication terminals as described above, the two communication terminals being connected to the first interface and the second interface.

The advantages of the apparatus, computer program, and system according to the present invention are identical or analogous to those of the above mentioned methods according to the present invention.

BRIEF DESCRIPTION OF THE FIGURES

Some embodiments of apparatus and/or methods in accordance with embodiments of the present invention are now described, by way of example only, and with reference to the accompanying drawings, in which:

FIG. 3 provides a flow chart of an embodiment of the methods according to the present invention;

FIG. 4 provides a block diagram of an embodiment of the inter-domain bridge according to the present invention.

DETAILED DESCRIPTION OF EMBODIMENTS

The skilled person will understand that any references to a home network in the present description are strictly exemplary and not intended to limit the scope of application of the present invention to residential settings. The invention is in fact also applicable to other settings in which several network segments are present in an architecture similar to the one implied by G.hn, including office, industry, hospitality, and educational settings.

Likewise, references to a "G.hn" network should not be construed as limiting the invention to implementations complying to that particular family of ITU-T Recommendations.

The number of transceivers shown in the figures is chosen for illustrative purposes only, and does not limit the generality of the invention in any way. Operations described in relation to a given transceiver may apply, mutatis mutandis, to other transceivers in the network.

Figure 1:
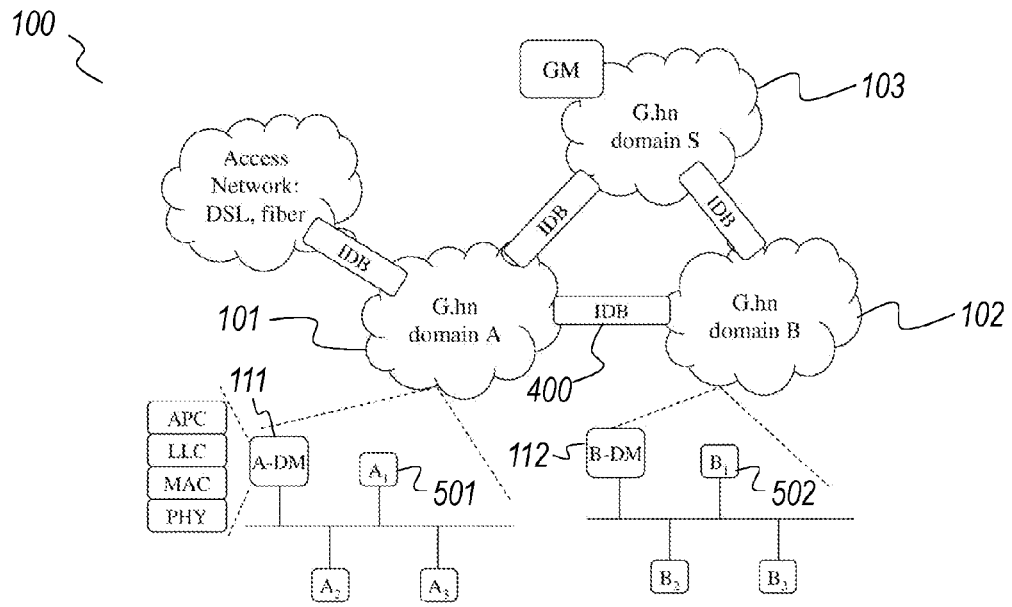
FIG. 1 illustrates an exemplary G.hn network architecture.

Reference is made to FIG. 1, which illustrates an exemplary network 100 according to the G.hn network architecture. A G.hn network is designed to operate over a variety of in-house physical media, including twisted pairs, power lines, and coaxial cabling, in a frequency band from close to DC up to 100 MHz. G.hn networks are standardized to use Orthogonal Frequency Division Modulation (OFDM), a modulation scheme which is also common in wireless systems such as IEEE 802.11 wireless local area networks. While our analysis has shown that the scheme of the invention works well in networks with OFDM-based data transmission, the skilled person will appreciate that the choice of modulation scheme does not affect the applicability of the inventive concept. Hence, the present invention may equally be applied to networks using other modulation schemes, including single-carrier schemes (e.g., quadrature amplitude modulation—QAM), code division multiple access (CDMA), discrete multi-tone (DMT), etc.

Each of the different types of physical media defines a "domain" within the G.hn network. A G.hn network may additionally interact with a wireless domain. Without loss of generality, three domains 101, 102, 103 are shown in FIG. 1. A number of inter-domain bridges (IDB) are shown, of which we will henceforth focus, without loss of generality, on the inter-domain bridge 400 present between a first domain 101 and a second domain 102.

Within each such domain, there may be a large number of devices or terminals communicating with each other. Within a particular domain, bidirectional communication is enabled by means of a collision avoidance scheme. In the remainder of the description, we will focus on a first terminal 501 in the first domain 101, and a second terminal 502 in the second domain 102.

Communication between domains relies on the presence of domain masters. In the network 100 of FIG. 1, a first domain master 111 manages the first domain 101, while a second domain master 112 manages the second domain 102.

The present invention is based inter alia on the insight that the involvement of the domain master in inter-domain communication between any pair of terminals residing in different domains causes serious scalability issues.

G.hn supports multi-port device functionality that can be exploited to enable efficient inter-domain bi-directional transmission. Considering the two terminals 501, 502, with identical parameters but different service flow priority, the higher priority flow will be given lower delay.

Often the available bandwidth may not be sufficient for all the service flows and consequently, service flows with higher priority will be assigned bandwidth resources at the cost of service flows with lower priority. However, for a large number of devices this approach may have long latency since the queuing between the domains can reduce the spectrum efficiency with increased costs and complexity. For example, if the available bandwidth is adequate to provide a single 100 Mbps transmission at a time, while two devices are in a waiting list with the same priority level one of the devices will have to wait to utilize the spectrum over the inter-domain bridge 400.

According to embodiments of the invention, a joint use of prioritizing and inter-domain bi-directional mechanism can be used to improve the spectrum efficiency, where the bi-directional scheme is initiated through the logical link control (LLC) function.

To initiate the inter-domain bi-directional mechanism a flow priority and queuing list are used in a sense of control parameters. Thus, based on these control parameters a list of partner devices (each from a different domain) is formed, which is called "partner list". By choosing a pairs of devices from the partner list, the LLC function triggers a new logical interface (henceforth X-I controller) to initiate the inter-domain mechanism. In addition, the network device parameters such as latency or/and jitter can be used as additional parameters to initiate the communication.

Figure 2:
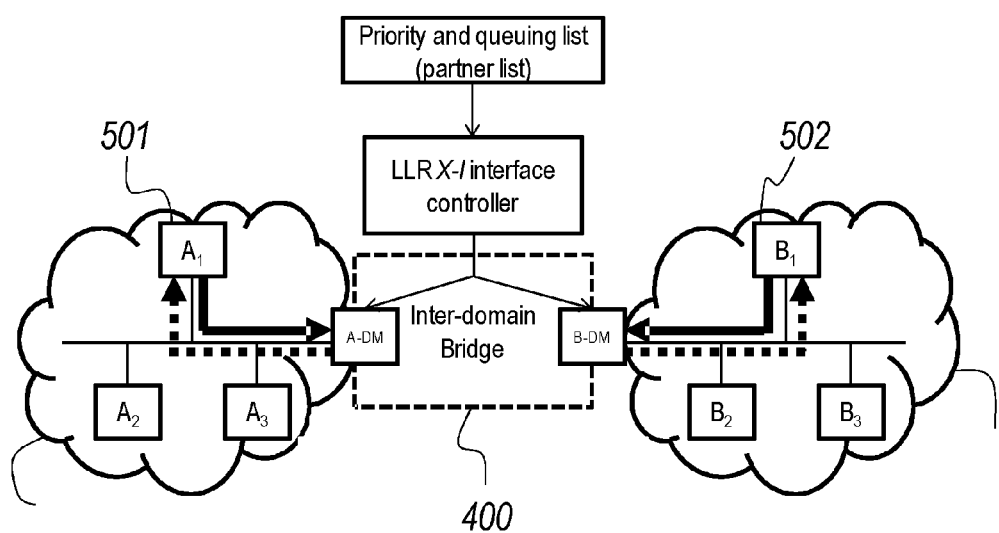
FIG. 2 illustrates a portion of the network of FIG. 1 in more detail.

This principle is illustrated in more detail in FIG. 2. In this figure, communications flowing simultaneously from the end points 501, 502 to the inter-domain bridge 400 in a first stage are symbolized by a solid arrow, while the (mixed) communications flowing back from the inter-domain bridge 400 to the end points 501, 502 in a second, subsequent stage are symbolized by a dotted arrow.

For the purpose of the present description, we assume that the two terminals 501, 502 ask for the network resources to achieve data communication of 100 Mbps. Next, acting as a reservation protocol, the X-I interface coordinates the transmission at the same time between a pair of devices from the partner list by allocating the network resources (i.e., time signaling intervals) for data transmission of 100 Mbps. Then, two devices are ready to start communication over the designated inter-domain bridge 400 by using the allocated time signaling intervals. In the first time slot (solid arrows), both devices A1 and B1 send their full (100 Mbps) data signals to the corresponding multi-port domain managers 111, 112, which are interconnected over the LLC function with designated inter-domain bridge node 400. During the second time slot (dotted arrows) the received signals on different ports of inter-domain bridge node 400 are superimposed and then, via the logical X-I interface, the inter-domain bridge 400 sends commands to the first domain manager 111 and the second domain manager 112 to broadcast the superimposed signal within their corresponding network domains 101, 102. Since both the first terminal 501 and the second terminal 502 know their own signals, they are able to subtract their information content and obtain the information from the partner device.

Thus, using the control parameters (i.e., flow priority and queuing list) the inter-domain bridge 400, through the X-I interface, is able to initiate and coordinate bi-directional communication between two devices 501, 502 from different domains 101, 102.

The methods and apparatus according to the invention therefore provide more efficient use of network resources, by carrying out the data relaying at the inter-domain bridges simultaneously in both direction.

The present invention is thus based inter alia on the insight that simultaneous transmission of different signals does not necessarily obscure the content of the message, because a transmitter can use its own copy of the transmitted message as a filter to extract the peer's message from the combined transmission.

The terminals 501, 502 apply a form of crosstalk cancellation or echo cancellation, in which the terminal's own previously transmitted signal is assumed to be the disturber. With adequate scheduling, the inter-domain bridge 400 can ensure that pairs of signals originating from a given pair of terminals 501, 502 are always sent simultaneously, which ensures that the intended recipient will always be able to disentangle communications addressed to it. Other terminals that receive the mixed communication via the broadcast channel will normally not be able to disentangle the communication, as they normally don't dispose of a copy of the outgoing communication signal.

The invention is further based on the insight that the mixing of communication signals, and thus also their disentanglement, may happen at physical layer, or at the packet level. In the latter case, the combining/disentangling may consist of applying a logical XOR operation to the two available signals in a bit-by-bit basis.

FIG. 3 provides a flow chart of an embodiment of the methods according to the present invention. For clarity reasons, steps carried out by an exemplary terminal 500 according to the present invention are illustrated in the left-hand column, while steps carried out by an exemplary inter-domain bridge 400 according to the present invention are illustrated in the right-hand column. The steps of the terminal's peer in the conversation are not explicitly shown.

In a first step 310, the terminal 500 transmits a first communication signal to inter-domain bridge 400. This step corresponds to the first step 320 occurring at the inter-domain bridge 400, which consists of receiving this first communication signal. In a second step 330, the inter-domain bridge 400 receives a second communication signal, as a result of a transmission by a second terminal (not shown). The aforementioned steps 310-330 may occur substantially simultaneously.

In a next step 340, the inter-domain bridge 400 generates a superimposed signal based on the first and second signals. The superposition may take place at the packet level, e.g. by the application of a bitwise XOR as mentioned above, or at the physical level, by adding voltage levels or light intensities representing the respective signals.

In a next step 350, the superimposed signals are retransmitted by the inter-domain bridge 400 to the end points 501, 502 (typically via the respective domain managers 511, 512).

FIG. 4 provides a block diagram of an embodiment of the inter-domain bridge 400 according to the present invention. It comprises a first interface 410 adapted to exchange signals with a first home networking segment (not shown, see 101 in FIGS. 1 and 2), a second interface 420 adapted to exchange signals with a second home networking segment (not shown, see 101 in FIGS. 1 and 2), and a superposition agent 430, configured to generate a superimposed signal of the first communication signal and the second communication signal, and to substantially simultaneously transmit said superimposed signal through the first interface 410 and the second interface 420.

The skilled person will appreciate that the interfaces 410, 420 comprise a combination of the necessary hardware and software to allow communication of the inter-domain bridge 400 with the network segment under consideration using the applicable protocols. As schematically shown, the superposition agent 430 is operatively coupled to the interfaces 410, 420, i.e. it is enabled to transmit and receive communication packets through these interfaces, hence the required minimal receiving and transmitting functions are implicitly present in the superposition agent 430.

The first interface 410 is preferably configured to operate over one of a twisted-pair segment, a coax segment (for instance according to the MOCA standard), and a power line segment. The second interface 420 is preferably configured to operate over another one of a twisted-pair segment, a coax segment (for instance according to the MOCA standard), and a power line segment.

Figure 5:
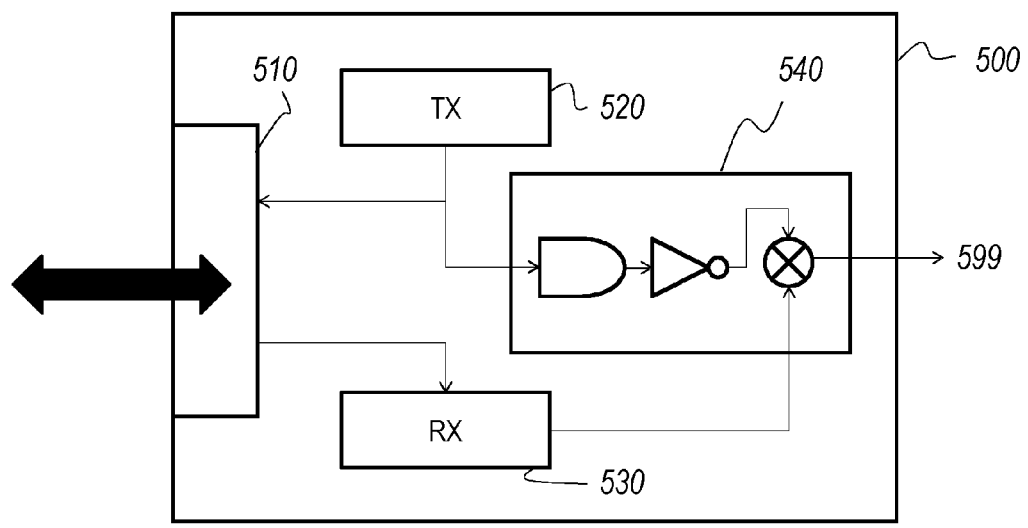
FIG. 5 provides a block diagram of an embodiment of the communication terminal according to the present invention.

FIG. 5 provides a block diagram of an embodiment of the communication terminal 500 according to the present invention. It comprises a communication interface 510 for exchanging signals with an inter-domain bridge 400 via a home network domain 101; a transmitter 520 for transmitting an outgoing communication signal through the communication interface 510; a receiver 530 for receiving an incoming communication signal through the communication interface 510; and means 540 for removing a component corresponding to the outgoing communication signal from the incoming communication signal in order to arrive at a difference signal 599.

In the context of the present invention, the resulting difference signal 599 represents the message of the conversation peer, which is obtained after cancelling the "self-crosstalk" out of the communication signal received from the inter-domain bridge 400.

The skilled person will again appreciate that the interface 510 comprises a combination of the necessary hardware and software to allow communication of the terminal 500 with the network segment under consideration using the applicable protocols. As schematically shown, the extraction means 540 is operatively coupled to the interface 510, i.e. it is enabled to transmit and receive communication packets through this interface, via transmitter 520 and receiver 530, respectively. The interface 510 is preferably configured to operate over one of a twisted-pair segment, a coax segment (for instance according to the MOCA standard), and a power line segment.

Although the superposition agent 430 is represented in FIG. 4 by means of certain logical processing symbols, this is done for illustrative purposes only, and not to limit the invention to this particular form of signal mixing. The same applies to the corresponding logical symbols used to represent the means for removing a signal component 540 in FIG. 5.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

The various features, options, and configurations described in connection with one or more apparatus according to the present invention may be applied to the methods according to the present invention and vice versa, without leaving the scope of the present invention.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for providing bidirectional communication between segments of a home network, the method comprising:
   receiving a first payload data communication signal at a first interface of an inter-domain bridge during a first time interval;
   receiving a second payload data communication signal at a second interface of said inter-domain bridge during said first time interval, the first and second payload data communications signals being unrelated signals that are being initially transmitted to different destinations;
   generating a superimposed signal of said first payload data communication signal and said second payload data communication signal;
   transmitting said superimposed signal through said first interface and said second interface during a second time interval, said second time interval occurring after said first time interval.

2. The method of claim 1, wherein said generating of said superimposed signal comprises combining binary data contents of said first payload data communication signal with binary data contents of said second payload data communication signal by applying an XOR-operation.

3. The method of claim 1, wherein said generating of said superimposed signal comprises adding a first physical parameter representing said first payload data communication signal to a second physical parameter representing said second payload data communication signal in the time domain.

4. A non-transitory computer readable medium storing instructions configured to cause a processor to carry out the method according to claim 1.

5. A method for communicating with a terminal in a different segment of a home network, the method comprising:
   transmitting a first payload data communication signal to an inter-domain bridge during a first time interval;
   receiving a second payload data communication signal from said inter-domain bridge during a second time interval;
   combining said transmitted first payload data communication signal and said received second payload data communication signal to extract a third payload data communication signal, corresponding to a transmission from said remote terminal received at said inter-domain bridge, the second payload data communication signal including the first payload data communication signal.

6. The method of claim 5, wherein said combining of said first communication and said second payload data communication signal comprises combining binary data contents of said first payload data communication signal with binary data contents of said second payload data communication signal by applying an XOR-operation.

7. The method of claim 5, wherein said combining of said first communication and said second payload data communication signal comprises subtracting a first physical parameter representing said first payload data communication signal from a second physical parameter representing said second payload data communication signal in the time domain.

8. An inter-domain bridge comprising:
a first interface adapted to exchange signals with a first home networking segment,
a second interface adapted to exchange signals with a second home networking segment,
a superposition agent, operatively coupled to said first interface and said second interface, said superposition agent being configured to generate a superimposed signal of a first payload data communication signal received from said first interface and a second payload data communication signal received from said second interface, wherein the first and second payload data communication signals are unrelated signals that are being initially transmitted to different destinations, and to simultaneously transmit said superimposed signal through said first interface and said second interface.

9. The inter-domain bridge of claim 8, wherein said superimposed signal comprises a combination of binary data contents of said first payload data communication signal with binary data contents of said second payload data communication signal obtained by applying an XOR-operation.

10. The inter-domain bridge of claim 8, wherein said superimposed signal comprises an addition of a first physical parameter representing said first payload data communication signal to a second physical parameter representing said second payload data communication signal in the time domain.

11. A communication terminal comprising:
a communication interface for exchanging signals with an inter-domain bridge via a home network domain;
a transmitter for transmitting an outgoing payload data communication signal through said communication interface;
a receiver for receiving an incoming payload data communication signal through said communication interface; and
means for removing a component corresponding to said outgoing payload data communication signal from said incoming payload data communication signal in order to arrive at a difference signal, wherein the outgoing and incoming payload data communications signals are unrelated signals that are being initially transmitted to different destinations.

12. The communication terminal of claim 11, wherein said difference signal is a combination of binary data contents of said incoming payload data communication signal with binary data contents of said payload data outgoing communication signal obtained by applying an XOR-operation.

13. The communication terminal of claim 11, wherein said difference signal is a difference of a first physical parameter representing said incoming payload data communication signal to a second physical parameter representing said outgoing payload data communication signal in the time domain.

14. A system including two communication terminals according to claim 11, comprising:
an inter-domain bridge, the inter-domain bridge including,
a first interface adapted to exchange signals with a first home networking segment,
a second interface adapted to exchange signals with a second home networking segment,
a superposition agent, operatively coupled to said first interface and said second interface, said superposition agent being configured to generate a superimposed signal of a first payload data communication signal received from said first interface and a second payload data communication signal received from said second interface, and to simultaneously transmit said superimposed signal through said first interface and said second interface; and
said two communication terminals being connected to said first interface and said second interface.

* * * * *